United States Patent [19]

Rohde

[11] Patent Number: 4,663,935

[45] Date of Patent: May 12, 1987

[54] ENERGY STORAGE AND RETRIEVAL SYSTEM FOR A VEHICLE

[75] Inventor: Steve M. Rohde, Utica, Mich.

[73] Assignee: General Motors Corporation, Detroit, Mich.

[21] Appl. No.: 711,749

[22] Filed: Mar. 14, 1985

[51] Int. Cl.$^4$ .............................................. F16D 31/02
[52] U.S. Cl. ........................................ 60/414; 60/415; 417/233
[58] Field of Search ................ 60/413, 414, 415, 419, 60/407, 412, 485; 180/165, 308; 417/233

[56] References Cited

U.S. PATENT DOCUMENTS

| | | | |
|---|---|---|---|
| 1,320,485 | 11/1919 | Maw et al. | 60/414 |
| 3,932,076 | 1/1976 | Thibault | 180/308 |
| 4,061,200 | 12/1977 | Thompson | 180/165 |
| 4,111,618 | 9/1978 | Thibault | 180/308 |
| 4,132,283 | 1/1979 | McCurry | 180/66 R |

FOREIGN PATENT DOCUMENTS

| | | | |
|---|---|---|---|
| 2408775 | 7/1979 | France | 60/414 |
| 0186520 | 11/1982 | Japan | 180/308 |

Primary Examiner—Edward K. Look
Attorney, Agent, or Firm—Donald F. Scherer

[57] ABSTRACT

A vehicle having a plurality of ground engaging wheels has included, in at least one of said wheels, a hydraulic pump/motor device. The hydraulic fluid for the pump/motor device is stored in a toroidal tire portion of the wheel while the pump/motor is disposed in a hub portion of the wheel. The hydraulic fluid is drawn from a sump reservoir in the tire portion and is pumped to a high pressure liquid/gas accumulator in the tire portion during vehicle braking. When desired, the high pressure fluid is returned through the pump/motor to the sump reservoir during which time the energy of the high pressure fluid is delivered to the vehicle through the motoring action of the pump/motor.

2 Claims, 2 Drawing Figures

ENERGY STORAGE AND RETRIEVAL SYSTEM FOR A VEHICLE

BACKGROUND OF THE INVENTION

This invention relates to energy storage and retrieval systems and more particularly to fluid energy storage and retrieval systems for vehicles.

SUMMARY OF THE INVENTION

The present invention provides a compact energy storage and retrieval system for use with a vehicle having ground engaging wheels. The toroidal portion of the ground engaging wheels, normally filled with gas such as air, is utilized to provide both a high pressure accumulator and a low pressure sump. A fluid pump/motor is housed in the hub portion of the wheel and has at least one member connected to a stationary support portion such as an axle. The hydraulic fluid passages are contained within the wheel and the control valving is assembled either in the vehicle wheel or in a separate housing mounted to the hub portion of the wheel. The hydraulic system is substantially enclosed by the wheel so that leakage to atmosphere through external connections is eliminated.

It is therefore an object of this invention to provide an improved fluid energy storage and retrieval system for a vehicle having a ground engaging wheel including a toroidal tire portion and a hub portion with a hydraulic pump/motor disposed in the hub portion and both an accumulator and a reservoir disposed in the tire portion and interconnected with the pump/motor such that hydraulic fluid can be stored under pressure in the accumulator during vehicle braking by the pump/motor and retrieved therefrom through the pump/motor during vehicle acceleration to provide energy to assist in operating the vehicle.

It is another object of this invention to provide an improved fluid energy storage and retrieval system for a vehicle having ground engaging wheels wherein at least one wheel has a hub portion incorporating a hydraulic pump/motor and a toroidal tire portion incorporating both a gas/hydraulic high pressure accumulator and a low pressure reservoir with both the accumulator and the reservoir being selectively connectible to the pump/motor so that the hydraulic portion of the accumulator is selectively filled by the pump/motor during vehicle deceleration and the hydraulic fluid is selectively returned through the pump/motor to assist in driving the vehicle during vehicle acceleration.

DESCRIPTION OF THE PREFERRED EMBODIMENT

Figure 1:
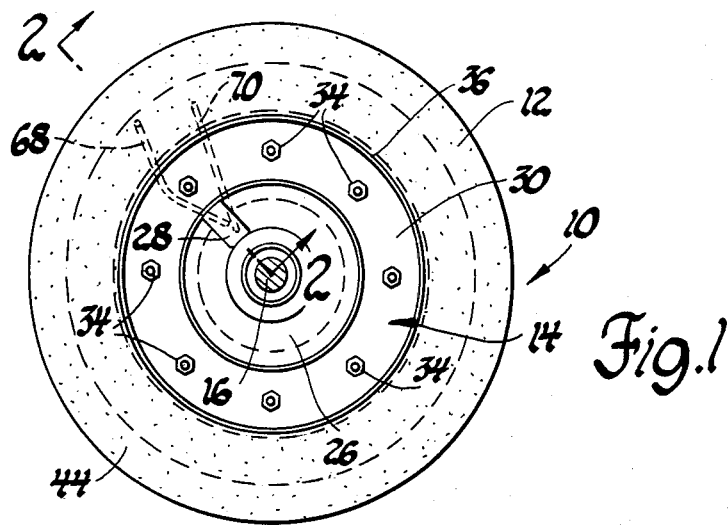
FIG. 1 is a side elevational view of a vehicle wheel.
Figure 2:
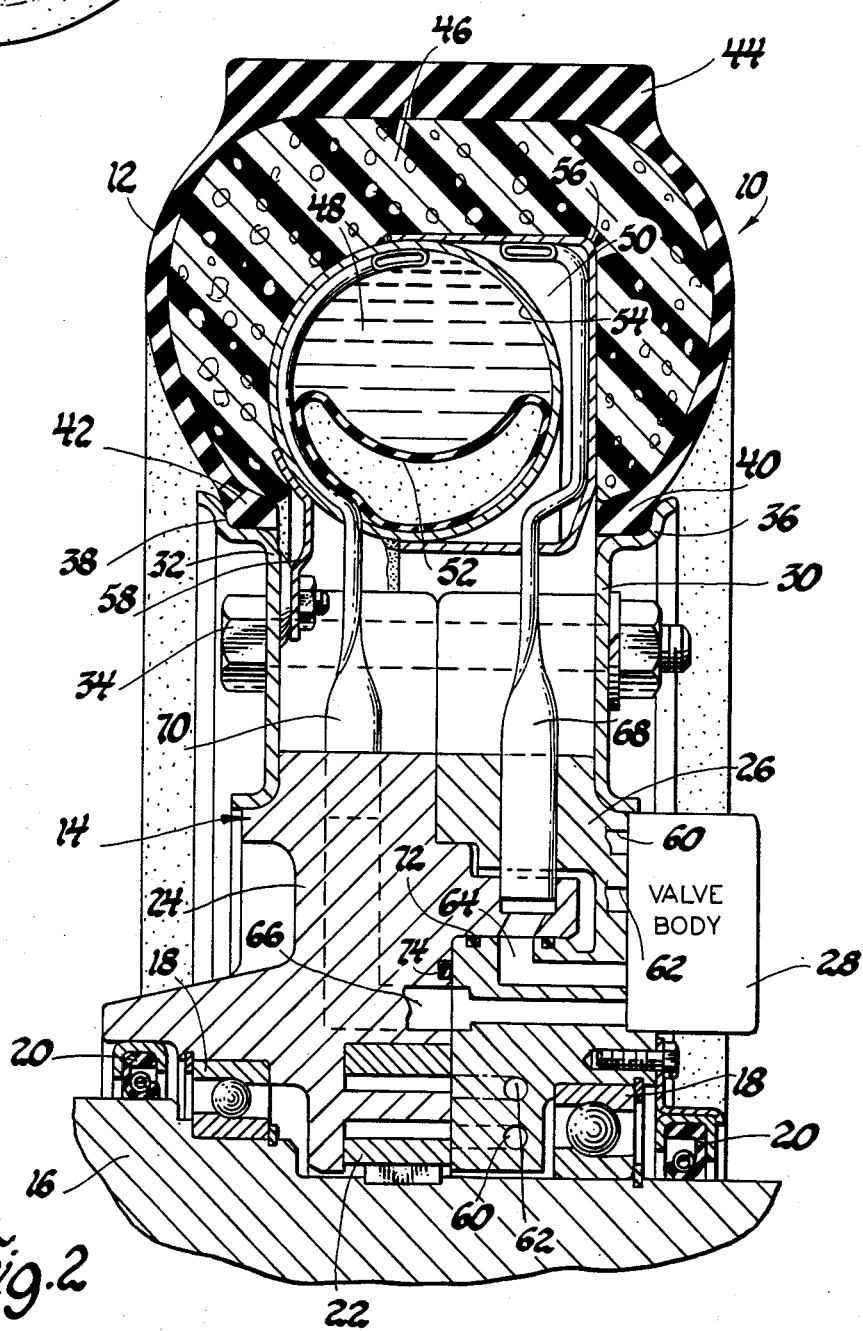
FIG. 2 is a sectional view taken along line 2—2 of FIG. 1 showing the present invention disposed within the wheel.

Referring to the drawings, wherein like characters represent the same or corresponding parts throughout the views, there is seen in FIG. 1 a vehicle wheel generally designated 10 having a toroidal tire portion 12 and a hub assembly 14. The hub assembly 14 is rotatably mounted on a vehicle axle 16, as seen in FIG. 2, by ball bearings 18 and sealed by lip seals 20.

The hub assembly 14 includes a conventional pump/motor assembly 22, a pair of housings 24 and 26, a valve body 28 and a pair of rim members 30 and 32 which are secured together by a plurality of fasteners 34. The rim members 30 and 32 are operable to maintain the housings 24 and 26 and the pump/motor 22 as a unitary package. The rim members 30 and 32 also provide annular seats 36 and 38, respectively, for inner beads 40 and 42 of the tire 12.

The tire 12 has an outer skin or structure 44 made of conventional rubber tire material. A portion of the tire 12 is filled with a pliable foam 46. The foam 46 surrounds a high pressure accumulator 48 and a low pressure reservoir or sump 50. The accumulator 48 includes a toroidal gas bladder 52 and a toroidal liquid chamber 54 which surrounds the bladder 52. The liquid chamber 54 is welded to an annular housing 56 and cooperates therewith to form the reservoir 50. The accumulator 48 and reservoir 50 are supported by the rim 32 through an annular wall member 58 such that the accumulator 48 and reservoir 50 will not rotate relative to the hub assembly 14.

The pump/motor 22 is a conventional hydraulic device such as an internal/external type gear mechanism. In the alternative the pump/motor 22 could be constructed of the well-known piston type or vane type mechanisms. The pump/motor 22 is connected with a pair of fluid passages 60 and 62 which are also connected to the valve body 28. The valve body 28 is connected to a low pressure passage 64 and a high pressure passage 66 which are connected to the reservoir 50 and liquid chamber 54, respectively, through liquid passages 68 and 70, respectively.

The valve body 28 houses a conventional valve mechanism, not shown. The mechanism can be a simple three-position four-way valve. Those skilled in the art will recognize that the valve mechanism can also be any of the more sophisticated or intricate valve mechanisms which provide pressure control and/or flow control as well as direction control for the fluid.

When the vehicle is moving on the roadway, the axle 16 is stationary relative to the vehicle while the wheel 10 is rotating. Under this condition, the valve body 28 would be conditioned to interconnect all of the passages 60, 62 and 64. The passage 66 would normally be closed so that any liquid under pressure in the accumulator 48 would be retained.

If the vehicle operator permits the vehicle to decelerate, the valve mechanism in valve body 28 will be operable to connect the discharge side of the pump/motor 22 with chamber 54 through passage 66 and passage 70. Simultaneously, the inlet side of the pump/motor will be connected with the reservoir 50 through passages 68 and 64. The pump/motor 22 will deliver fluid to the chamber 54 of accumulator 48, the pressure of which fluid is determined by the gas pressure in the bladder 52. The gas pressure within the bladder is preselected at assembly. The pressure is set at a very high level, for example, in the range of 1500 to 3000 lbs. per square inch, the fluid delivered to the accumulator 48 is supplied from the reservoir 50.

When the accumulator 48 is filled to maximum capacity with hydraulic fluid, the valve mechanism 28 will disconnect passage 66 from the pump/motor 22 and simultaneously interconnect passages 60, 62 and 64. This is done to prevent overpressurizing of the accumulator 48. The system can also have a built in safety mechanism in that only sufficient fluid to fill the accumulator 48 is placed in the reservoir 50 at assembly. This, however, can cause the pump/motor to be noisy during some periods of operation.

If the accumulator 48 is pressurized with fluid and the operator desires to accelerate the vehicle, the valve mechanism in valve body 28 can be manipulated such that the passages 70 and 66 are connected to the inlet side of the pump/motor while the discharge side thereof is connected to passages 64 and 68. The high pressure fluid acting on the pump/motor inlet will cause energy to be delivered to the wheel 10 which will assist in accelerating the vehicle or simply provide added energy at a steady state condition thereby reducing the amount of energy consumed by the vehicle prime mover. When the fluid pressure in the accumulator 48 has been depleted, the valve mechanism in valve body 28 can be manipulated to close passage 66 and interconnect passages 60, 62 and 64.

From the above description, it is seen that the energy storage and retrieval system described herein is compact and space saving in that no additional volume is required to provide storage of either the low pressure or high pressure fluid which is used in the system. The basic energy and storage retrieval system described herein can be utilized in all four vehicle wheels, if desired, or in any combination of the vehicle vehicle wheels.

The housings 24 and 26 have associated therewith annular seals 72 and 74, of the 0-ring type, which prevent fluid leakage. These seals are always in a static condition thereby further reducing the likelihood of leakage. The area of the axle-pump/motor interface is sealed by the lip seals 20. Fluid in this area will lubricate the bearings 18.

The embodiments of the invention in which an exclusive property or privilege is claimed are defined as follows:

1. A fluid energy storage and retrieval system for use with a vehicle comprising: an axle; a ground engaging wheel including a hub portion rotatably supported on said axle and a toroidal tire portion secured to and surrounding said hub portion; fluid pump/motor means disposed in said hub portion for operation as a pump or a motor and being operatively connected between said hub portion and said axle; high pressure fluid accumulator means disposed in the toroidal tire portion; low pressure fluid reservoir means disposed in said tire portion; fluid passage means connecting said accumulator means and said reservoir means with said pump/motor means; and control means for selectively directing high pressure fluid from said pump/motor means operating as a pump to said accumulator during vehicle braking and for selectively directing high pressure fluid from said accumulator means to said pump/motor means operating as a motor during vehicle acceleration to provide a driving force for the vehicle.

2. A fluid energy storage and retrieval system for use with a vehicle comprising: an axle; a ground engaging wheel including a hub portion rotatably supported on said axle and a toroidal tire portion secured to and surrounding said hub portion; fluid pump/motor means disposed in said hub portion for operation as a pump in one condition and as a motor in another condition and being operatively connected between said hub portion and said axle; high pressure fluid accumulator means disposed in the toroidal tire portion; low pressure fluid reservoir means disposed in said tire portion; said accumulator and reservoir being secured together and further fastened to said hub portion; said tire portion, except for said reservoir and accumulator, being filled with a pliable foam material; fluid passage means connecting said accumulator means and said reservoir means with said pump/motor means; and control means for selectively directing high pressure fluid from said pump/motor means operating as a pump to said accumulator during vehicle braking and for selectively directing high pressure fluid from said accumulator means to said pump/motor means operating as a motor during vehicle acceleration to provide a driving force for the vehicle.

* * * * *